United States Patent
Li et al.

(10) Patent No.: US 8,731,093 B2
(45) Date of Patent: May 20, 2014

(54) COMMUNICATION SYSTEM HAVING DATA-DEPENDENT SUPERIMPOSED TRAINING MECHANISM AND COMMUNICATION METHOD THEREOF

(75) Inventors: Chih-Peng Li, Kaohsiung (TW);
Kuei-Cheng Chan, Kaohsiung (TW);
Yu-Sing Lin, Pingtung County (TW);
Chin-Liang Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 58 days.

(21) Appl. No.: 13/527,921

(22) Filed: Jun. 20, 2012

(65) Prior Publication Data
US 2013/0188679 A1    Jul. 25, 2013

(30) Foreign Application Priority Data

Jan. 20, 2012 (TW) .............................. 101102751 A (51) Int. Cl.
*H04B 7/02* (2006.01)

(52) U.S. Cl.
USPC ............................ 375/267; 370/208; 375/260

(58) Field of Classification Search
None
See application file for complete search history.

(56) References Cited

U.S. PATENT DOCUMENTS

| | | | |
|---|---|---|---|
| 2008/0232449 A1* | 9/2008 | Khan et al. | 375/220 |
| 2010/0118989 A1* | 5/2010 | Sayana et al. | 375/260 |
| 2013/0094344 A1* | 4/2013 | Zhang et al. | 370/208 |

OTHER PUBLICATIONS

T.Whitworth et al., Data Identifiability for Data-Dependent Superimposed Training, IEEE, 2007, pp. 2545-2550.
Mounir Ghogho et al., Full-Rank and Rank-Deficient Precoding Schemes for Single-Carrier Block Transmissions, IEEE, Nov. 2009, pp. 44332-4442, vol. 57, No. 11.

* cited by examiner

*Primary Examiner* — Leon-Viet Nguyen
(74) *Attorney, Agent, or Firm* — Muncy, Geissler, Olds & Lowe, P.C.

(57) ABSTRACT

The present invention discloses a communication system with a data-dependent superimposed training mechanism and a communication method thereof. The system uses a precoding module installed in front of the data-dependent superimposed training mechanism to precode data by a precoding matrix. The precoding matrix is a N×N unitary matrix, which is constructed by Q×Q precoding sub-matrix. Q is the block size N divided by the channel length. The precoding matrix can achieve full frequency diversity. Any two sets of data precoded by the precoding matrix must be different from each other, such that the receiver can effectively identify the data transmitted from the transmitter and the computational complexity of the receiver is reduced.

12 Claims, 7 Drawing Sheets

COMMUNICATION SYSTEM HAVING DATA-DEPENDENT SUPERIMPOSED TRAINING MECHANISM AND COMMUNICATION METHOD THEREOF

This application claims the benefit of Taiwan Patent Application No. 101102751, filed on Jan. 20, 2012, in the Taiwan Intellectual Property Office, the disclosure of which is incorporated herein in its entirety by reference.

BACKGROUND OF THE INVENTION

1. Field of the Invention

The present invention relates to a communication system, in particular to a data-dependent superimposed training system and a method thereof that use a precoding matrix to overcome the problem of identifying data.

2. Description of Related Art

In the field of communication systems, channel estimation is a very important part of the receiver, and pilot signals are equidistantly inserted into transmission data to obtain a mean square error of the smallest channel. In a conventional time division multiplexing (TDM) method, data and pilot signals are transmitted at different time points, but this method will lower the efficiency of bandwidths. Another method is to superimpose a training sequence with data before transmitting the data, but this method gives poor channel estimation. The data-dependent superimposed training system (DDST) not only maintains the efficiency of bandwidths, but also maintains the channel response of the channel estimation to a precision same as the time division multiplexing (TDM) method. Since the cyclic mean of the data must be removed before transmitting the data, the receiver cannot restore the signals effectively without knowing the existence of the cyclic mean. If a high-level modulation technology is used, the receiver will have a higher chance of producing a misjudgment.

At present, technologies capable of reducing data misjudgments in a data-dependent superimposed training system are disclosed. As disclosed by T. Whitworth, M. Ghogho, and D. C. McLernon in "Data Identifiability for Data-Dependent Superimposed Training," in Proc. IEEE International Conference on Communications, Glasgow, UK, June 2007, pp. 2545-2550 and M. Ghogho, T. Whitworth, A. Swami, and D. C. McLernon in "Full-Rank and Rank-Deficient Precoding Schemes for Single-Carrier Block Transmissions," was published in IEEE Trans Signal Process, vol. 57, no. 11, pp. 4433-4442, November 2009.

Although the aforementioned methods can find the lost values in a time domain and a frequency domain to reduce the probability of having data misjudgments, yet these methods cannot solve the issue of data misjudgment completely, and the computational complexity of the receiver is still very high. Therefore, it is a main subject of the present invention to provide a communication system and a method thereof capable of overcome the data misjudgment problem of the data-dependent superimposed training system thoroughly.

SUMMARY OF THE INVENTION

In view of the shortcomings of the prior art, it is a primary objective of the present invention to provide a communication system with a data-dependent superimposed training mechanism and a communication method thereof in accordance with the present invention to overcome the problems of data misjudgment and computational complexity of the conventional data-dependent superimposed training system.

To achieve the aforementioned objective, the present invention provides a communication system with a data-dependent superimposed training mechanism, comprising: a transmitter, comprising: a modulation module, for receiving two-bit data to produce modulation data; and a precoding module, for receiving the modulation data, and precoding the modulation data by a precoding matrix to produce precoding data, and the transmitter adding the precoding data to a data-dependent superimposed training sequence to produce superimposition data, and the superimposition data being added to a cyclic prefix to produce transmission data; and a receiver, for receiving the transmitted data, and removing the cyclic prefix, and then executing a discrete Fourier transform to perform a channel estimation, and then performing a frequency domain equalization and an inverse discrete Fourier transform before performing a demodulation process, so as to restore the transmitted data; wherein, the precoding matrix is an N×N unitary matrix comprised of a Q×Q precoding sub-matrix, and Q is equal to a block size N divided a channel length, and the precoding matrix distributes the modulation data uniformly on the frequency domain, and any two sets of data precoded by the precoding matrix must be different from each other, such that the receiver can identify the transmitted data and reduce a computational complexity of the receiver effectively.

To achieve the aforementioned objective, the present invention provides a communication method of communication system with a data-dependent superimposed training mechanism, and the communication method comprises the steps of using a modulation module of a transmitter to receive two-bit data to produce modulation data; using a precoding module of the transmitter to precode the modulation data of a precoding matrix to produce precoding data, wherein the precoding matrix is an N×N unitary matrix and comprised of a Q×Q precoding sub-matrix, Q is equal to a block size N divided by a channel length, and any two sets of data precoded by the precoding matrix must be different from each other; using the transmitter to add the precoding data to a data-dependent superimposed training sequence to produce superimposition data, and adding a cyclic prefix into the superimposition data to produce transmission data; removing the cyclic prefix of the transmitted data by a receiver, and then executing a discrete Fourier transform to perform a channel estimation, and then performing a frequency domain equalization and an inverse discrete Fourier transform, before performing a demodulation process to restore the transmitted data.

Preferably, the precoding matrix is comprised of a discrete Fourier transform matrix and a diagonal matrix having a perfect sequence of diagonal elements.

Preferably, the precoding matrix satisfies the relation of:

$$E = \frac{1}{\sqrt{Q}} DF^H$$

E is a precoding sub-matrix, Q is a block size N divided by a channel length, D is a diagonal matrix having a perfect sequence of diagonal elements, and $F^H$ is an inverse discrete Fourier transform matrix.

Preferably, the perfect sequence is a Zadoff-Chu sequence.

Preferably, the perfect sequence has the same gain of frequency domain and time domain.

Preferably, the receiver further comprises a demodulation module, and the demodulation module executes the demodulation process by a maximum likelihood detection.

In summation, the communication system and method with a data-dependent superimposed training mechanism in accordance with the present invention have one or more of the following advantages:

(1) The present invention uses the precoding matrix to precode data before the data-dependent superimposed training sequence, and then uses maximum likelihood detection (ML Detection) to demodulate and restore signals, so that the receiver will not have the issue of data misjudgment.

(2) The precoding matrix of the present invention is a unitary matrix, so that the invention can reduce the computational complexity of the receiver significantly.

(3) The present invention improves the data-dependent superimposed training system to avoid wasting the bandwidth and achieve the best channel estimation performance.

DESCRIPTION OF THE PREFERRED EMBODIMENTS

The technical characteristics of the present invention will become apparent with the detailed description of the preferred embodiments accompanied with the illustration of related drawings as follows. It is noteworthy to point out that same numerals are used for representing the same respective elements in the drawings.

Figure 1:
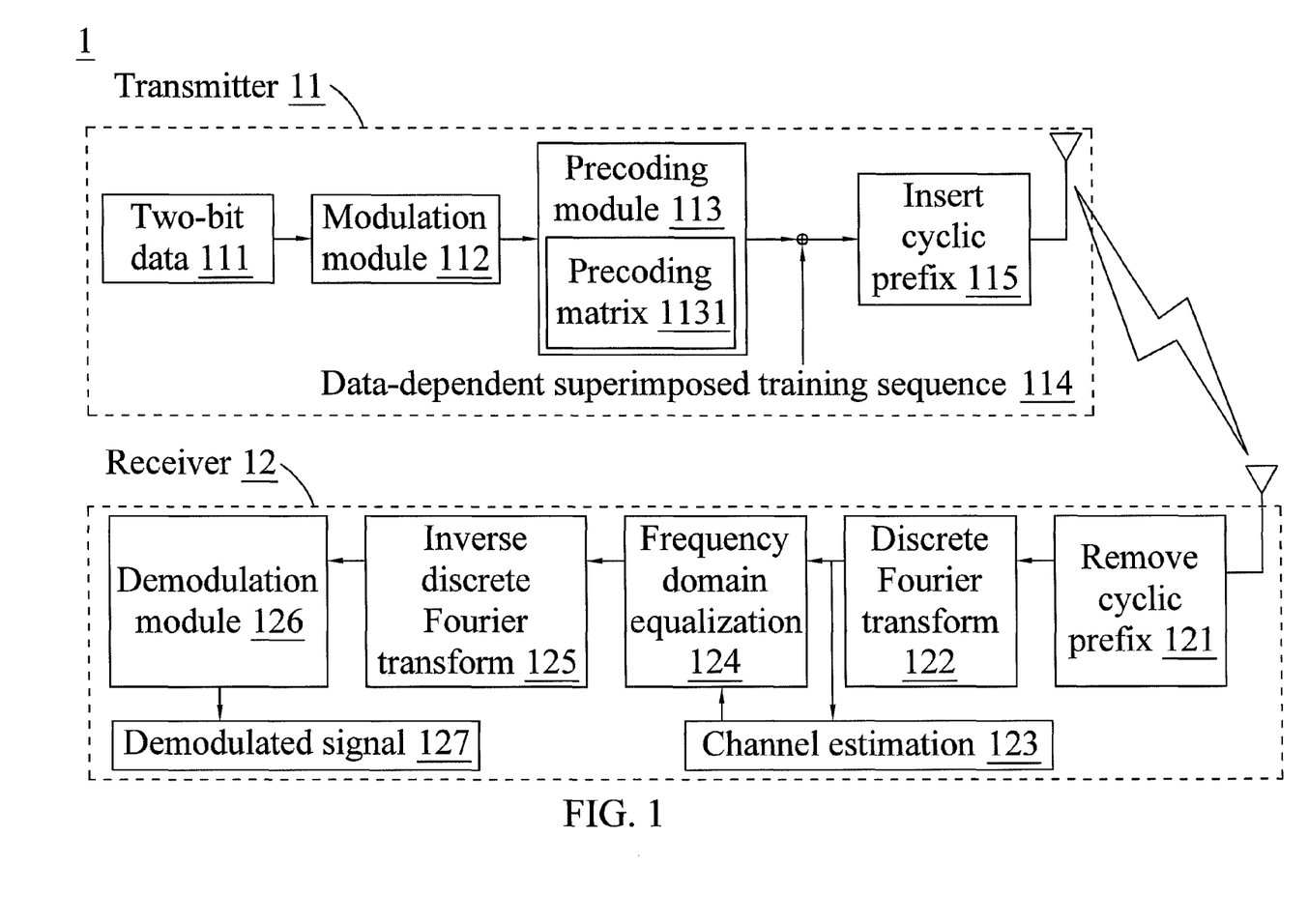
FIG. 1 is a block diagram of a communication system with a data-dependent superimposed training mechanism of the present invention.

With reference to FIG. 1 for a block diagram of a communication system with a data-dependent superimposed training mechanism in accordance with the present invention, the data-dependent superimposed training system 1 comprises a transmitter 11 and a receiver 12. The transmitter 11 comprises a modulation module 112 and a precoding module 113.

The receiver 12 includes a demodulation module 126. The modulation module 112 receives two-bit data 111 to produce modulation data. The precoding module 113 uses a precoding matrix 1131 to precode the modulation data to produce precoding data. In the method of the present invention, the precoding matrix 1131 must satisfy certain specific conditions to achieve the effect of identifying data correctly by the receiver 12 and reducing the computational complexity. The precoding matrix 1131 is a unitary matrix comprised of a Q×Q matrix and expanded to an N×N matrix, wherein Q is equal to a block size N diving a channel length, and the precoding matrix distributes the modulation data uniformly on a frequency domain, and any two set of data precoded by the precoding matrix must be different from each other.

The receiver 11 adds the precoding data to the data-dependent superimposed training sequence 114 to produce superimposition data. After the superimposition data are inserted into cyclic prefix insertion 115, transmission data are produced and transmitted to the receiver 11. After the cyclic prefix removal 121 of the transmission data is removed from, a discrete Fourier transform (DFT) 122 is perform to convert the data into the frequency domain data in order to perform a channel estimation 123. And then, a frequency domain equalization 124 and an inverse discrete Fourier transform (IDFT) 125 are performed to convert the data into time domain data and transmit the time domain data to a demodulation module 126 to execute the demodulation, so as to produce a demodulation signal 127.

It is noteworthy to point out that the precoding matrix 1131 of the present invention is a unitary matrix capable of reducing the computational complexity of the receiver 12 significantly. In addition, the precoding matrix 1131 distributes the modulation data uniformly on a frequency domain to achieve the effect of full frequency diversity. Any two sets of data precoded by the precoding matrix 1131 data must be different from each other, so that the receiver 12 can effectively identify the transmission data, and the receiver 12 will not have any data identification problem.

On the other hand, after the receiver 12 received a signal with channel compensation, the characteristics of the data-dependent superimposed training technology divides the received signal into a plurality of sub-blocks, and the demodulation module 126 of the present invention can restore the data by different demodulation technologies. To assure that the receiver 12 can identify the data correctly, the present invention provides a modulation technology of maximum likelihood detection (ML Detection) to provide an optimal data identification performance of the receiver 12.

To allow those ordinarily skilled in the art to understand the precoding matrix of the present invention more clearly, each required condition of the precoding matrix of the present invention will be described in details as follows.

The precoding matrix distributes the modulation data uniformly on a frequency domain to achieve the effect of full frequency diversity. If the sub-carrier is interfered and cannot be demodulated, data of some portion of other sub-carriers can be recovered, since the data have been distributed uniformly on the frequency domain. Therefore, the precoding matrix satisfies the conditions of the following relation:

$$|(FE)_{n,m}| = \frac{1}{\sqrt{N}}, \quad 0 \leq n, m \leq N-1 \tag{1}$$

All elements of the precoding matrix E processed by the Fourier transform have equal amplitudes.

The I-J matrix of the original data-dependent superimposed training system can be represented by:

$$(I - J) = (P_{DDST} \otimes I_K) \tag{2}$$

$$P_{DDST} = \left(I_Q - \frac{1}{Q} 1_Q\right)$$

Wherein $I_Q$ and $1_Q$ are matrices having a size equal to Q, and $I_Q$ is a unitary matrix, and $1_Q$ is a matrix having all elements equal to 1. The $P_{DDST}$ is a sub-matrix of the data-dependent superimposed training sequence system.

To reduce the computational complexity, the precoding matrix G must satisfy the following relation:

$$G = (E \otimes I_K)$$

$$(I-J)G = (P_{DDST} E \otimes I_K) \tag{3}$$

The precoding matrix is a unitary matrix, such that a lower complexity is achieved when the receiver performs a reverse computing operation, and thus the precoding matrix satisfies the following relation:, $$G^H G = G G^H = I, \ G^{-1} = G^H$$

$$E^H E = E E^H = I, \ E^{-1} = E^H \quad (4)$$

Wherein, $E^H$ is a Hermitian matrix of the precoding sub-matrix E, $E^{-1}$ is an inverse matrix of the precoding sub-matrix E, $G^H$ is a Hermitian matrix of the precoding matrix G, and $G^{-1}$ is a reverse matrix of the precoding matrix G. $I_K$ is a unit matrix having a size of K, wherein K≥L, and L is a channel length.

Any two sets of data precoded by the precoding matrix must be different from each other, so that the receiver can restore data effectively, and the following relations are satisfied:

$$\Theta_{a_{i,x}}^- \neq \Theta_{a_{i,y}}^-, \Theta = P_{DDST} E, \Theta_{(a_{i,x}^- - a_{i,y}^-)} \neq 0 \quad (5)$$

Therefore, $$(a_{i,x}^- - a_{i,y}^-) \notin N(\Theta) \quad (6)$$

Wherein, Θ is a sub-matrix comprised of a sub-matrix $P_{DDST}$ and a coding sub-matrix E of the data-dependent superimposed training sequence system, and $a_{i,x}, a_{i,y}$ are data sub-blocks with any two length equal to Q×1, wherein x≠y.

According to the Relation (5), the precoding matrix of the present invention can be represented by the following relations:

$$E = \frac{1}{\sqrt{Q}} D F^H, \Theta = P_{DDST} E \quad (7)$$

Wherein, Θ is a sub-matrix comprised of a sub-matrix $P_{DDST}$ and a coding sub-matrix E of the data-dependent superimposed training sequence system, $D_{ZC}$ is a diagonal matrix having a perfect sequence of diagonal elements, and $F^H$ is an inverse discrete Fourier transform matrix. The perfect sequence has the same gain of frequency domain and time domain, and can be a Zadoff-Chu sequence.

Figure 2:
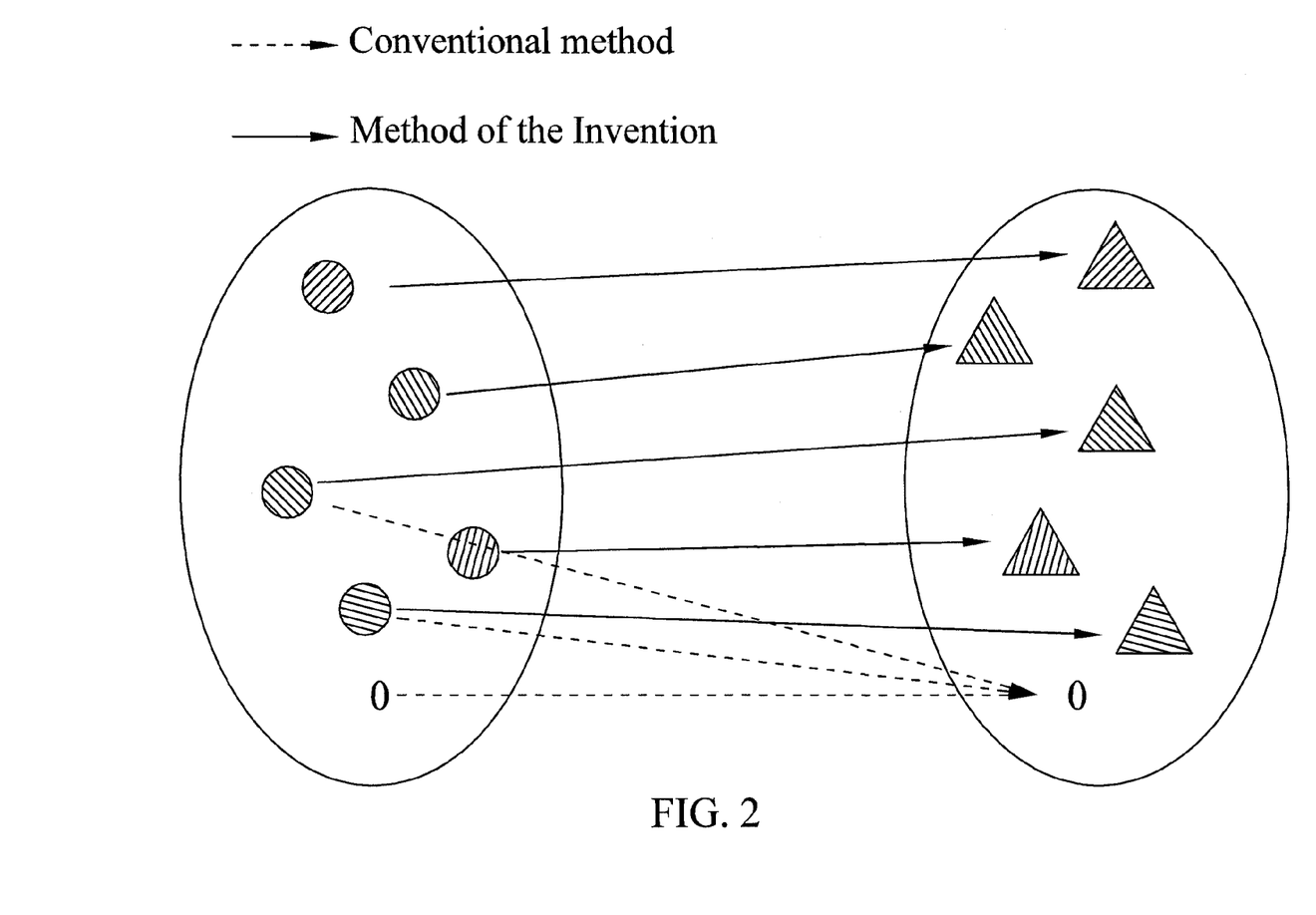
FIG. 2 is a schematic view of a communication system with a data-dependent superimposed training mechanism in accordance with a preferred embodiment of the present invention.

With reference to FIG. 2 for a schematic view of a communication system with a data-dependent superimposed training mechanism in accordance with a preferred embodiment of the present invention, the solid line in the figure represents a corresponding signal of the receiver after the modulation data are processed by the operation of the precoding matrix of the present invention, and the dotted line represents a corresponding signal of the receiver after the modulation data are processed by the operation of the precoding matrix of a conventional data-dependent superimposed training system.

After the conventional data-dependent superimposed training system processes the modulation data by the operation of I–J matrix, a certain combination will correspond to zero-vector. Therefore, the receiver cannot determine which set of signals are transmitted. The method of the present invention can keep each set of sub-groups in 1-to-1 correspondence, so that the receiver can adopt different demodulation systems to restore signals. The present invention uses a maximum likelihood detection to demodulate and restore signals, so that the error rate can be reduced significantly.

Figure 3:
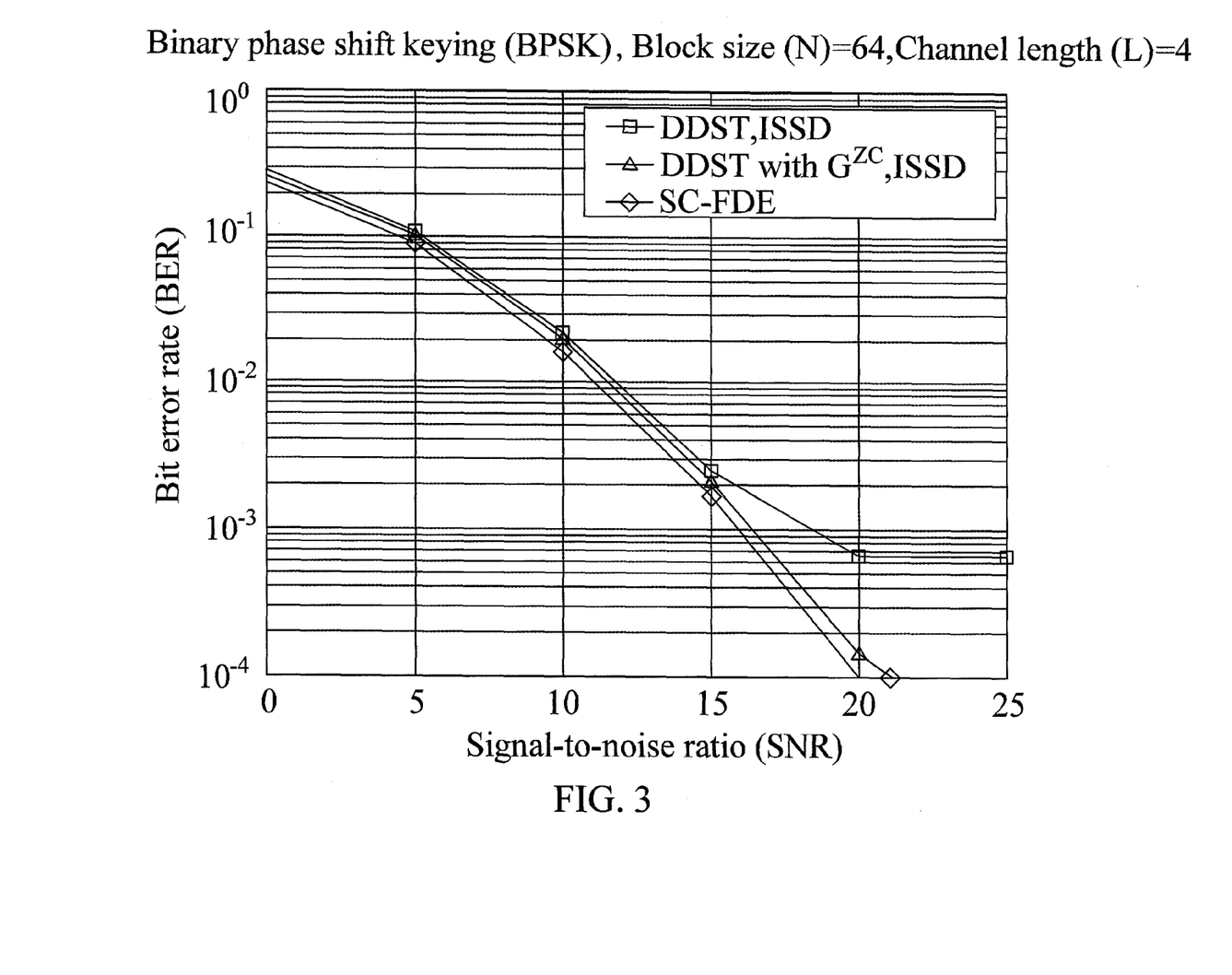
FIGS. 3, 4, 5 and 6 are graphs of simulated results of a communication system with a data-dependent superimposed training mechanism in accordance with a preferred embodiment of the present invention.
Figure 4:
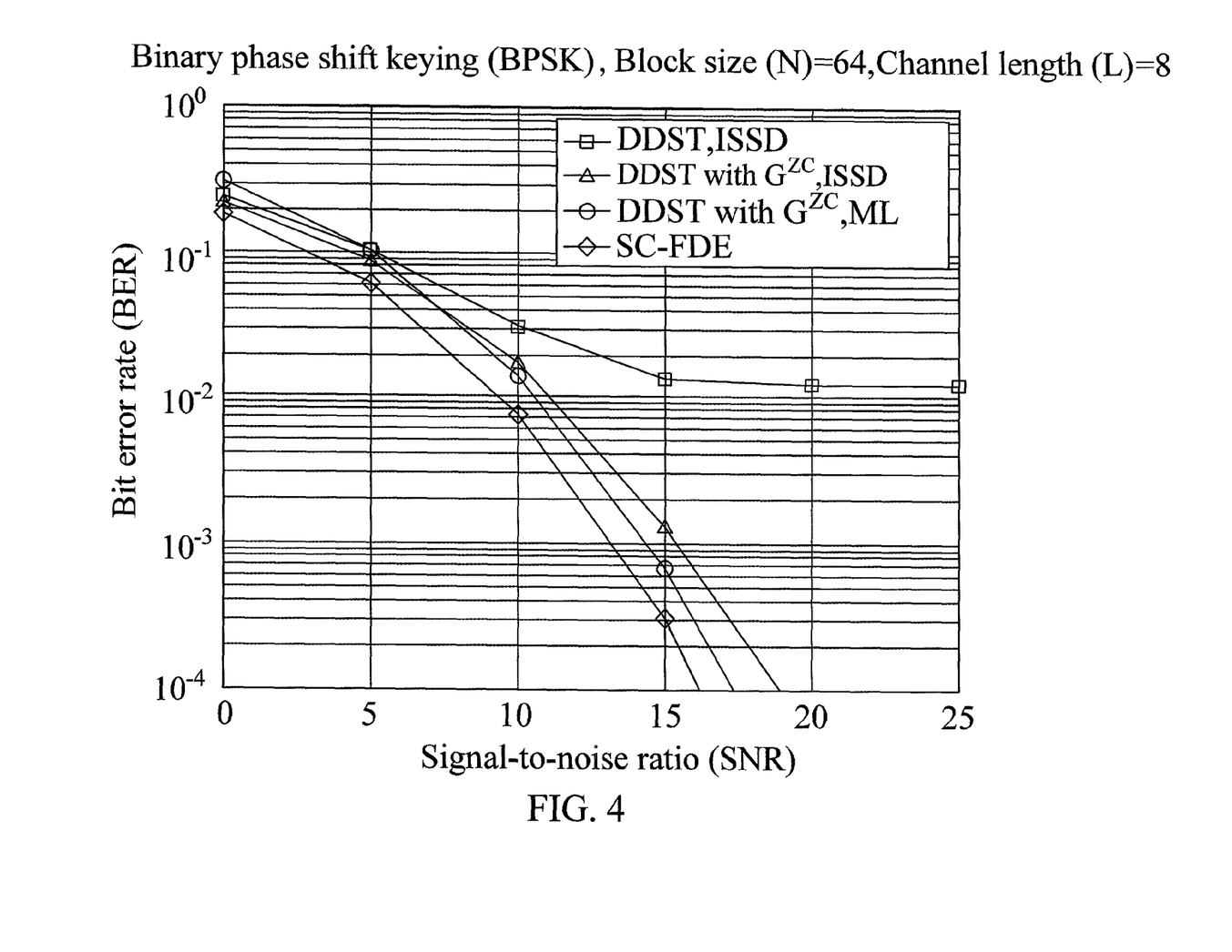

With reference to FIGS. 3 and 4 for graphs of simulated results of a communication system with a data-dependent superimposed training mechanism in accordance with a preferred embodiment of the present invention respectively, FIGS. 3 and 4 show the simulated results of the bit error rate (BER) of various different systems and the system of the present invention provided that different simulated parameters and a binary phase shift keying (BPSK) modulation technology are used, and a single carrier frequency domain equalization (SC-FDE) system is used as a standard for comparison.

In FIGS. 3 and 4, the precoding matrix $G^{ZC}$ of the present invention uses the data-dependent superimposed training system (DDST) with the iteration successive superimposition detection (ISSD) demodulation technology to provide sufficient performance for the use of the binary phase shift keying modulation technology.

However, if the block size is much greater than the channel length, there is still a very small probability for having equal transmitted elements in the sub-group as shown in FIG. 3, so that a wrong base may occur at BER=(½)$^{N/L}$. In the figure, it is obvious that the data-dependent superimposed training system of the present invention adopting the precoding matrix $G^{ZC}$ together with the maximum likelihood detection (ML) demodulation technology provides an excellent performance.

Figure 5:
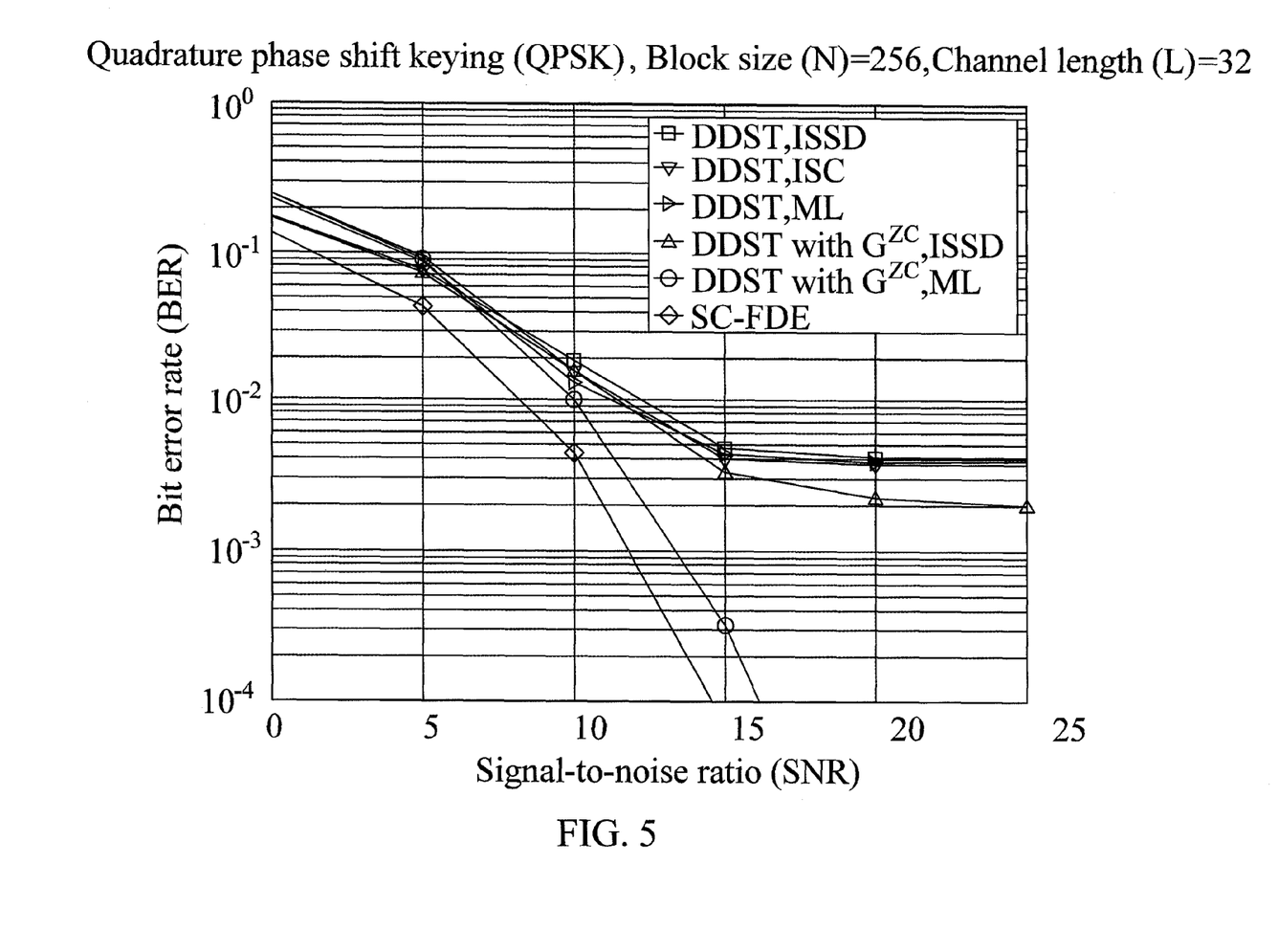
Figure 6:
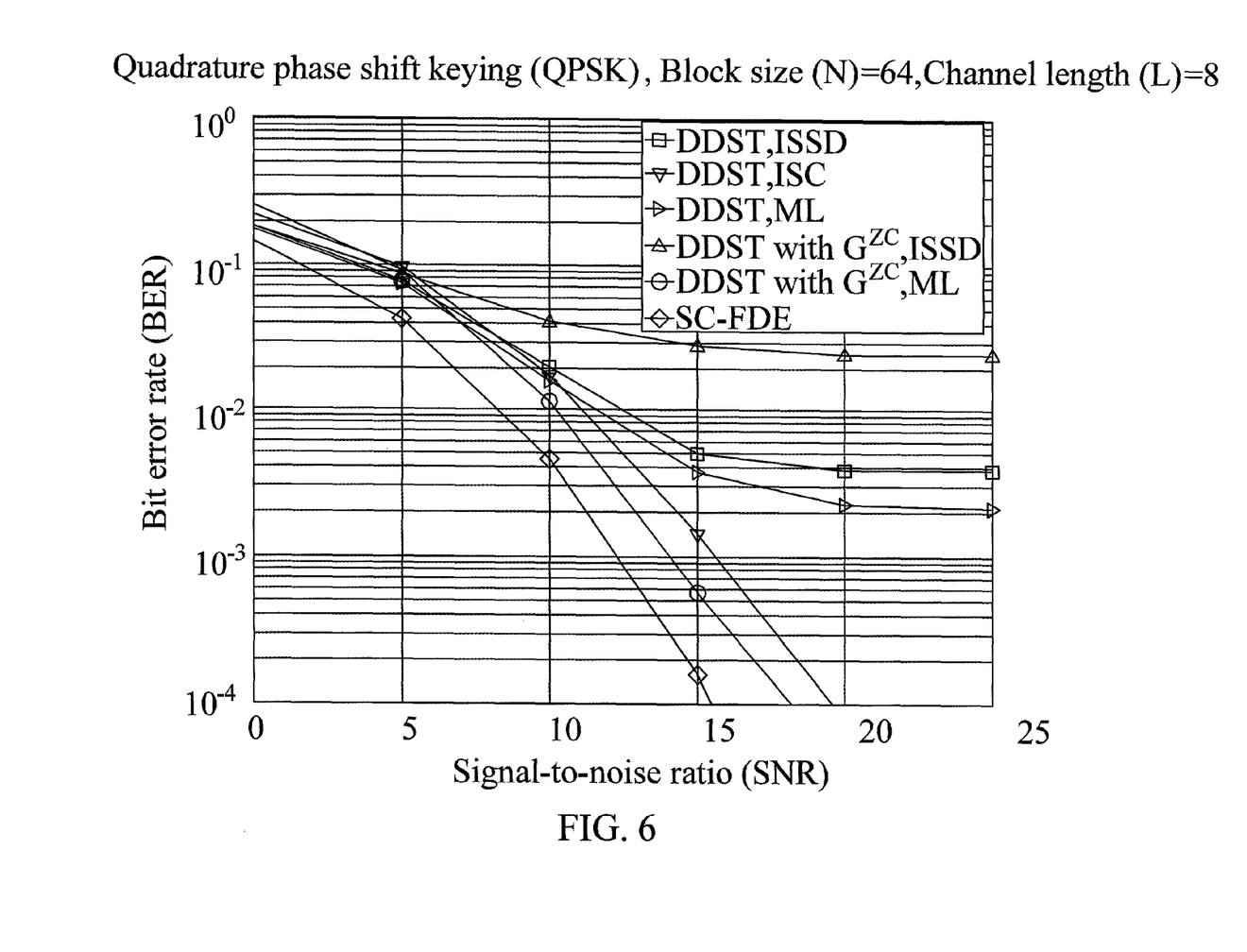

With reference to FIGS. 5 and 6 for graphs of simulated results of a communication system with a data-dependent superimposed training mechanism in accordance with a preferred embodiment of the present invention respectively, FIGS. 5 and 6 show that the simulated results of the bit error rate (BER) of various different systems and the system of the present invention provided that different simulated parameters and a quadrature phase shift keying (QPSK) modulation technology are used.

In FIGS. 5 and 6, it is obvious that the data-dependent superimposed training system of the present invention adopting the precoding matrix $G^{ZC}$ together with the maximum likelihood detection (ML) demodulation technology provides an excellent performance without the occurrence of any wrong base, and the infinite constellation shifting (ICS) method cannot improve the performance of the quadrature phase shift keying (QPSK) modulation technology.

Figure 7:
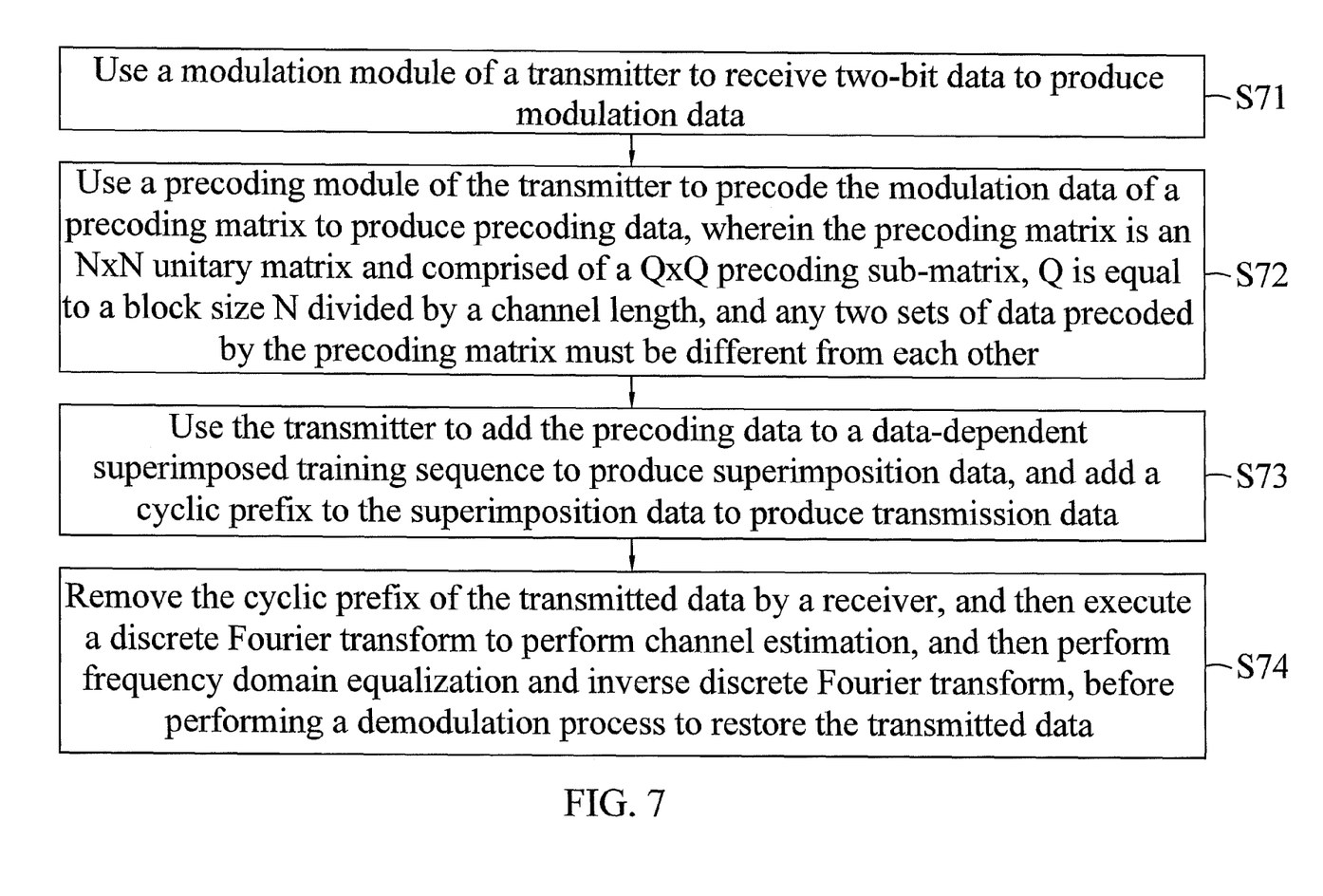
FIG. 7 is a flow chart of a communication method of a communication system with a data-dependent superimposed training mechanism in accordance with the present invention.

Even though the concept of the method of the present invention capable of solving the data identification problem of a data-dependent superimposed training system has been described in the section of data-dependent superimposed training device of the invention, a flow chart is drawn to illustrate the method as follows:

With reference to FIG. 7 for a flow chart of a communication system with a data-dependent superimposed training mechanism of the present invention.

S71: Use a modulation module of a transmitter to receive two-bit data to produce modulation data.

S72: Use a precoding module of the transmitter to precode the modulation data of a precoding matrix to produce precoding data, wherein the precoding matrix is an N×N unitary matrix and comprised of a Q×Q precoding sub-matrix, Q is equal to a block size N divided by a channel length, and any two sets of data precoded by the precoding matrix must be different from each other.

S73: Use the transmitter to add the precoding data to a data-dependent superimposed training sequence to produce superimposition data, and add a cyclic prefix to the superimposition data to produce transmission data S74: Remove the cyclic prefix of the transmitted data by a receiver, and then execute a discrete Fourier transform to perform channel estimation, and then perform frequency domain equalization and inverse discrete Fourier transform, before performing a demodulation process to restore the transmitted data.

The details and implementation of the data-dependent superimposed training system of the present invention capable of overcoming the data identification problem has been described in the section of the data-dependent superimposed training system of the invention, and thus will not be repeated.

In summation of the description above, the present invention uses a precoding module installed in front of the data-dependent superimposed training mechanism to precode data by a precoding matrix, and then uses the maximum likelihood detection to demodulate and restore signals, so that the receiver will not have the problem of data misjudgment. In addition, the precoding matrix of the present invention is a unitary matrix, so that the computational complexity of the receiver can be reduced significantly. The present invention improves over the conventional data-dependent superimposed training system to avoid wasting the bandwidth and achieve the best performance of the channel estimation.

In summation of the description above, the present invention breaks through the prior, achieves the expected effects, and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A communication system with a data-dependent superimposed training mechanism, comprising:
   a transmitter, comprising:
      a modulation module, arranged for receiving two-bit data to produce modulation data; and
      a precoding module, arranged for receiving the modulation data, and precoding the modulation data by a precoding matrix to produce precoding data, and the transmitter adding the precoding data to a data-dependent superimposed training sequence to produce superimposition data, and the superimposition data being added to a cyclic prefix to produce transmission data; and
   a receiver, arranged for receiving the transmitted data, and removing the cyclic prefix, and then executing a discrete Fourier transform to perform a channel estimation, and then performing a frequency domain equalization and an inverse discrete Fourier transform before performing a demodulation process, so as to restore the transmitted data;
   wherein, the precoding matrix is an N×N unitary matrix comprised of a Q×Q precoding sub-matrix, and Q is equal to a block size N divided by a channel length, and the precoding matrix distributes the modulation data uniformly on the frequency domain, and any two sets of data precoded by the precoding matrix must be different from each other, such that the receiver can identify the transmitted data and reduce a computational complexity of the receiver effectively;
   wherein the precoding sub-matrix is comprised of a discrete Fourier transform matrix and a diagonal matrix having a perfect sequence of diagonal elements;
   wherein the perfect sequence has the same gain of frequency domain and time domain.

2. The communication system with a data-dependent superimposed training mechanism of claim 1, wherein the precoding sub-matrix satisfies the relation of:

$$E = \frac{1}{\sqrt{Q}} DF^H$$

wherein, E is the precoding sub-matrix, Q is equal to the block size N divided by the channel length, D is the diagonal matrix having a perfect sequence of diagonal elements, and $F^H$ is the inverse discrete Fourier transform matrix.

3. The communication system with a data-dependent superimposed training mechanism of claim 2, wherein the precoding matrix G satisfies the relation of:

$$G = (E \otimes I_K)$$

wherein, E is the precoding sub-matrix, $I_K$ is a unit matrix with a size of K, L is the channel length and K≥L.

4. The communication system with a data-dependent superimposed training mechanism of claim 2, wherein the perfect sequence is a Zadoff-Chu sequence.

5. The communication system with a data-dependent superimposed training mechanism of claim 2, wherein the perfect sequence has the same gain of frequency domain and time domain.

6. The communication system with a data-dependent superimposed training mechanism of claim 1, wherein the receiver further comprises a demodulation module, the demodulation module executes the demodulation process by a maximum likelihood detection (ML detection).

7. A communication method of communication system with a data-dependent superimposed training mechanism, the method comprising comprises the steps of:
   using a modulation module of a transmitter to receive two-bit data to produce modulation data;
   using a precoding module of the transmitter to precode the modulation data of a precoding matrix to produce precoding data, wherein the precoding matrix is an N×N unitary matrix and comprised of a Q×Q precoding sub-matrix, Q is equal to a block size N divided by a channel length, and any two sets of data precoded by the precoding matrix must be different from each other;
   using the transmitter to add the precoding data to a data-dependent superimposed training sequence to produce superimposition data, and adding a cyclic prefix to the superimposition data to produce transmission data;
   removing the cyclic prefix of the transmitted data by a receiver, and then executing a discrete Fourier transform to perform a channel estimation, and then performing a frequency domain equalization and an inverse discrete Fourier transform, before performing a demodulation process to restore the transmitted data;
   wherein the precoding sub-matrix is comprised of a discrete Fourier transform matrix and a diagonal matrix having a perfect sequence of diagonal elements;
   wherein the perfect sequence has the same gain of frequency domain and time domain.

8. The communication method of communication system with a data-dependent superimposed training mechanism as recited in claim 7, wherein the precoding sub-matrix satisfies the relation of:

$$E = \frac{1}{\sqrt{Q}} DF^H$$

wherein, E is a precoding sub-matrix, Q is a block size N divides a channel length, D is a diagonal matrix having a perfect sequence of diagonal elements, and $F^H$ is an inverse discrete Fourier transform matrix.

9. The communication method of communication system with a data-dependent superimposed training mechanism as recited in claim 8, wherein the perfect sequence has the same gain of frequency domain and time domain.

10. The communication method of communication system with a data-dependent superimposed training mechanism as recited in claim 8, wherein the precoding matrix G satisfies the relation of:

$$G = (E \otimes I_K)$$

wherein, E is the precoding sub-matrix, Ik is a unit matrix having a size of K, L is the channel length and K≥L.

11. The communication method of communication system with a data-dependent superimposed training mechanism as recited in claim 8, wherein the perfect sequence is a Zadoff-Chu sequence.

12. The communication method of communication system with a data-dependent superimposed training mechanism as recited in claim 7, further comprising the step of using a demodulation module to execute the demodulation process by a maximum likelihood detection.

* * * * *